(12) United States Patent
Haynes et al.

(10) Patent No.: US 11,554,871 B2
(45) Date of Patent: Jan. 17, 2023

(54) TRUSS STRAP INTEGRATED GEOMETRIC RESTRAINT

(71) Applicant: GOODRICH CORPORATION, Charlotte, NC (US)

(72) Inventors: Timothy C. Haynes, Prescott Valley, AZ (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 560 days.

(21) Appl. No.: 16/734,666

(22) Filed: Jan. 6, 2020

(65) Prior Publication Data

US 2021/0206498 A1 Jul. 8, 2021

(51) Int. Cl.
| | | |
|---|---|---|
| *B64D 25/14* | (2006.01) | |
| *A62B 1/20* | (2006.01) | |
| *B63B 27/14* | (2006.01) | |
| *B64D 25/18* | (2006.01) | |
| *B60P 7/08* | (2006.01) | |

(52) U.S. Cl.
CPC ............... *B64D 25/14* (2013.01); *A62B 1/20* (2013.01); *B60P 7/0823* (2013.01); *B63B 2027/145* (2013.01); *B64D 25/18* (2013.01)

(58) Field of Classification Search
CPC ..... B64D 25/14; A62B 1/20; B63B 2027/145; B60P 7/0823
See application file for complete search history.

(56) References Cited

U.S. PATENT DOCUMENTS

| | | | | |
|---|---|---|---|---|
| 3,897,861 | A * | 8/1975 | Miller | B64D 25/14 193/25 B |
| 4,333,546 | A | 6/1982 | Fisher | |
| 4,460,062 | A * | 7/1984 | Fisher | A62B 1/20 193/25 B |
| 6,443,259 | B1 * | 9/2002 | Oney | B64D 25/14 182/48 |
| 6,966,414 | B2 | 11/2005 | Zonneveld | |
| 8,952,828 | B2 | 2/2015 | Kohlmeier-Beckmann et al. | |
| 9,296,484 | B2 | 3/2016 | Biro | |
| 9,309,002 | B2 | 4/2016 | Fellmann et al. | |
| 9,701,411 | B2 | 7/2017 | Kohlmeier-Beckmann et al. | |
| 10,351,251 | B2 | 7/2019 | Haynes et al. | |
| 2013/0200217 | A1 * | 8/2013 | Biro | B64D 25/14 244/137.2 |
| 2018/0273188 | A1 * | 9/2018 | Volny | B63B 27/14 |
| 2019/0092482 | A1 * | 3/2019 | Volny | B64D 25/14 |

* cited by examiner

*Primary Examiner* — Tye William Abell
(74) *Attorney, Agent, or Firm* — Snell & Wilmer L.L.P.

(57) ABSTRACT

The present disclosure provides a truss strap integrated geometric restraint for an evacuation slide. The truss strap integrated geometric restraint may comprise a first strap configured to be coupled to a first portion of the evacuation slide, a second strap configured to be coupled to a second portion of the evacuation slide, and a third strap detachably coupled to a third portion of the evacuation slide and configured to disengage from the portion of the slide in response to a predetermined force acting on the release mechanism, wherein the truss strap integrated geo restraint is configured to increase beam strength of the evacuation slide.

11 Claims, 5 Drawing Sheets

TRUSS STRAP INTEGRATED GEOMETRIC RESTRAINT

FIELD OF THE DISCLOSURE

The present disclosure relates to aircraft evacuation systems, and more particularly, truss strap integrated geometric restraints for the deployment of evacuation slide systems and methods of assembling evacuation slide systems.

BACKGROUND OF THE DISCLOSURE

Certain aircraft evacuation systems may include an inflatable slide that helps passengers disembark from an aircraft in the event of an emergency or other evacuation event. The slides may deploy from a door sill or side of the aircraft fuselage and begin to inflate with pressurized air from a pressurized air source. Given the weight distribution and size of the slides, the slides may be prone to move in response to surrounding wind conditions. In order to limit such movement, the slides may be restrained with a number of devices configured to achieve a desired inflation sequence of the slide. Reducing part counts, costs, and the weight associated with these restraining devices can be important design considerations.

SUMMARY OF THE DISCLOSURE

A truss strap integrated geometric restraint for an evacuation slide may comprise a first strap configured to be coupled to a first portion of the evacuation slide, a second strap configured to be coupled to a second portion of the evacuation slide, and a third strap detachably coupled to a third portion of the evacuation slide and configured to disengage from the third portion of the evacuation slide in response to a predetermined force acting on a release mechanism, wherein the truss strap integrated geometric restraint is configured to increase beam strength of the evacuation slide.

In various embodiments, the truss strap integrated geometric restraint further comprises a first attachment coupled to the first strap. The truss strap integrated geometric restraint may further comprise a second attachment coupled to the second strap. The truss strap integrated geometric restraint further may further comprise a release assembly positioned between the first strap and the second strap. The release assembly may comprise the third strap and a release pin coupled to the third strap. The truss strap integrated geometric restraint may further comprise a cover surrounding the release pin and the third strap. The release pin may comprise a parachute pin.

An evacuation slide may comprise a head end and a toe end opposite the head end; and a truss strap integrated geometric restraint coupled to the head end and the toe end, the truss strap integrated geometric restraint configured to assist a staged deployment of the evacuation slide and increase beam strength of the evacuation slide.

In various embodiments, the truss strap integrated geometric restraint comprises a first strap configured to be coupled to a first portion of the evacuation slide, a second strap configured to be coupled to a second portion of the evacuation slide, and a third strap detachably coupled to a third portion of the evacuation slide and configured to disengage from the third portion of the evacuation slide in response to a predetermined force acting on a release mechanism. The truss strap integrated geometric restraint may further comprise a first attachment coupled to the first strap. The truss strap integrated geometric restraint may further comprise a second attachment coupled to the second strap. The truss strap integrated geometric restraint may further comprise a release assembly positioned between the first strap and the second strap. The truss strap integrated geometric restraint may further comprise a release assembly positioned between the first strap and the second strap. The release assembly may comprise the third strap and a release pin coupled to the third strap. The evacuation slide may comprise a first loop and a second loop, the second loop configured to receive the release pin. The evacuation slide may further comprise a string coupled to the release pin and the second loop and configured to sever to allow the release pin to decouple from the second loop.

A method of assembling an evacuation slide may comprise coupling a first strap of a truss strap integrated geometric restraint to a first portion of an evacuation slide, coupling a second strap of a truss strap integrated geometric restraint to a second portion of an evacuation slide, and detachably coupling a third strap of the truss strap integrated geometric restraint to a third portion of the evacuation slide, wherein the truss strap integrated geometric restraint is configured to aid in staged deployment of the evacuation slide and increase beam strength of the evacuation slide.

In various embodiments, the first portion is a toe end of the evacuation slide and the second portion is a head end of the evacuation slide. The method may further comprise coupling a release pin to the third strap. The method may further comprise inserting the release pin into a loop coupled to the third portion of the evacuation slide.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

Figure 1A:
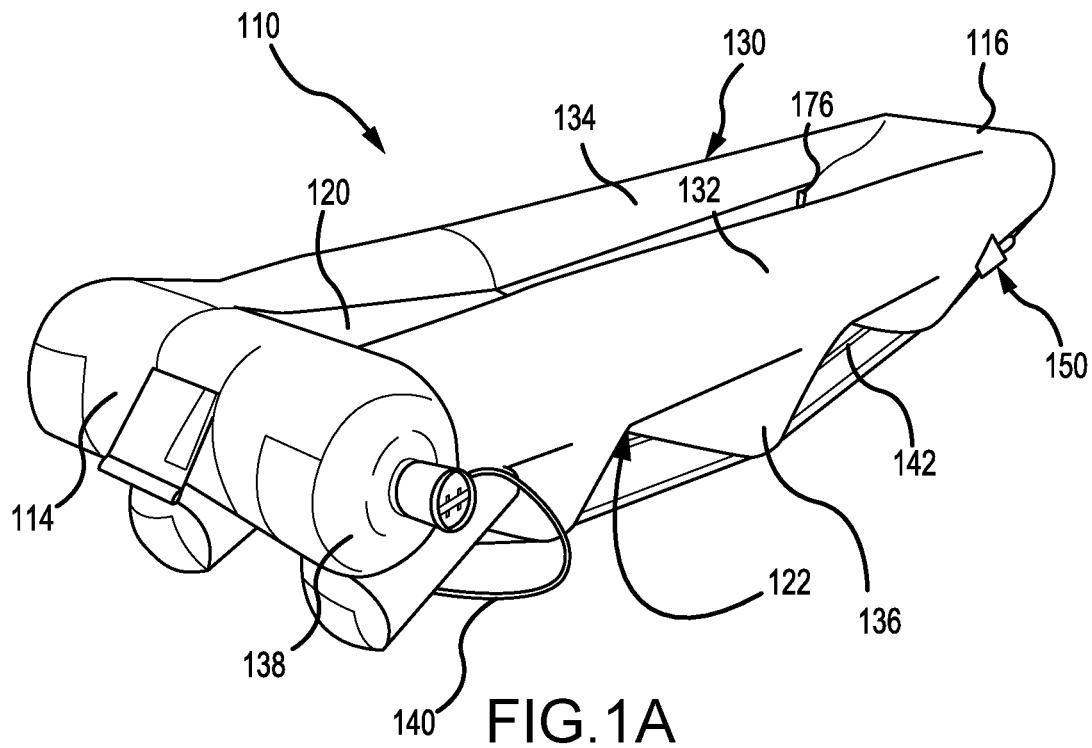
FIGS. 1A and 1B illustrate perspective views of an evacuation slide in a deployed position and including a truss strap integrated geometric restraint, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with aircraft evacuation systems. However, various aspects of the disclosed embodiments may be adapted for performance in a variety of other systems. As such, numerous applications of the present disclosure may be realized.

In order to limit part counts, costs, and weight associated with evacuation slides, while still ensuring the evacuation slide deploys in the desired sequence to limit wind effects on the evacuation slide as the slide inflates, truss strap integrated geometric restraint devices are disclosed herein.

In general, traditional evacuation slides may comprise a number of truss straps extending along a bottom surface of the evacuation slide. Such truss straps may increase the structural integrity of the inflated slides by increasing beam strength of the slide. As a result, the evacuation slide may permit passengers disembarking an associated aircraft to slide down the evacuation slide without causing the evacuation slide to collapse from loading caused by the disembarking passengers.

Traditional evacuation slides may generally further comprise one or more geometric restraint devices configured to ensure the slide deploys in the desired sequence to reduce wind effect on the slide as the slide is inflated. In general, the geometric restraint devices may maintain a geometry of the slide until a predetermined force associated with inflation of the slide causes the geometric restraint device to fail, thereby allowing the slide to continue inflating until a fully deployed configuration is achieved. However, these geometric restraint devices are formed separately from the truss straps which may result in increased part counts, costs, and weight associated with the evacuation slide system.

Figure 1B:
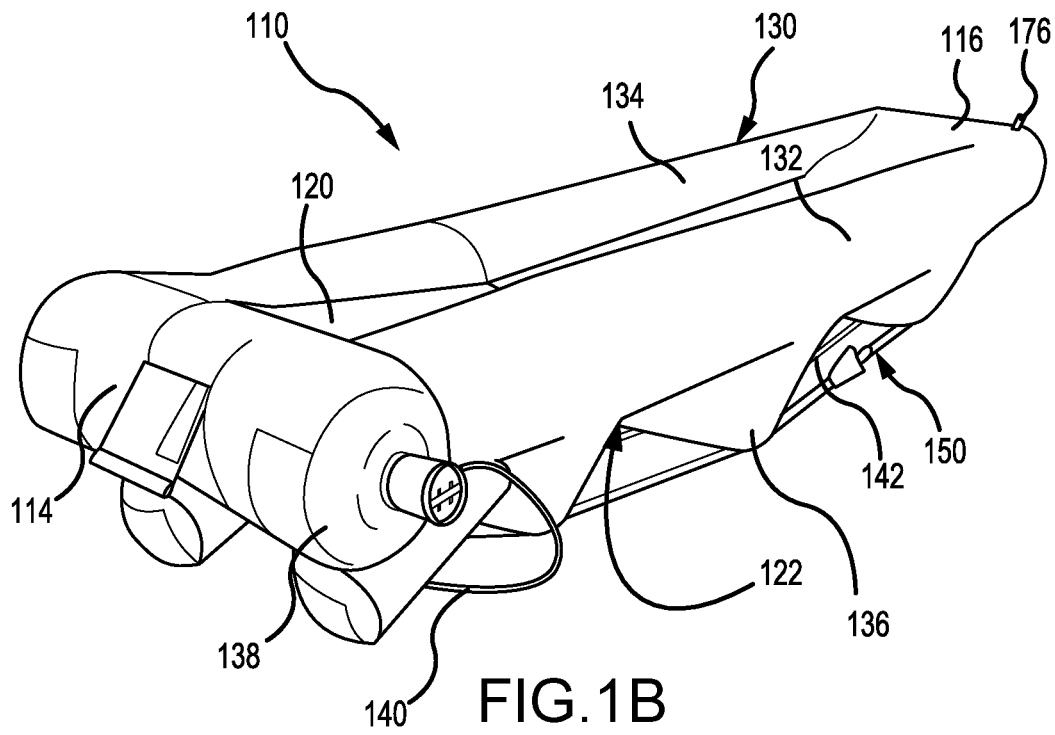

Accordingly, with reference to FIGS. 1A and 1B, evacuation slide 110 is illustrated in an inflated or "deployed" position. In accordance with various embodiments, evacuation slide 110 includes a head end 114 and a toe end 116 opposite head end 114. Head end 114 may be coupled to an aircraft structure (e.g., a fuselage of an aircraft). In accordance with various embodiments, evacuation slide 110 is an inflatable slide. Evacuation slide 110 includes a sliding surface 120 and an underside surface 122 opposite sliding surface 120. Sliding surface 120 extends from head end 114 to toe end 116. In response to an evacuation event (i.e., to deployment of evacuation slide 110), underside surface 122 may be oriented toward an exit surface (e.g., toward the ground or toward a body of water). While evacuation slide 110 is illustrated as a single lane slide, it is contemplated and understood that evacuation slide 110 may include any number of lanes.

Evacuation slide 110 includes a slide rail structure 130. In accordance with various embodiments, slide rail structure 130 includes a first inflatable side rail 132 and a second inflatable side rail 134. First and second inflatable slide rails 132, 134 extend between head end 114 and toe end 116. First inflatable side rail 132 is located at a first side of sliding surface 120. Second inflatable side rail 134 is located at a second side of sliding surface 120 opposite the first side. In various embodiments, evacuation slide 110 may include one or more transverse tubes 136 located on underside surface 122 and extending between first inflatable side rail 132 and second inflatable side rail 134. In the event of a water landing, transverse tubes 136 may be located in the water, upon release of evacuation slide 110 from aircraft 100.

Evacuation slide 110 may further comprise a pressurized vessel 138 coupled to head end 114 and configured to deliver a pressurized air source to evacuation slide 110 via air line 140. In general, pressurized vessel 138 may deliver pressurized air to head end 114 to inflate head end 114 first then down evacuation slide 110 towards toe end 116. Evacuation slide 110 may further comprise a girt configured to couple evacuation slide 110 to an aircraft.

Evacuation slide 110 further comprises one or more truss straps 142 coupled to head end 114 and toe end 116 and extending along underside surface 122. Truss straps 142 may comprise nylon, ballistic nylon, polypropylene, polyester, cotton, or other suitable material configured to reinforce underside surface 122 of evacuation slide 110. For example, as passengers disembark from an aircraft and slide down sliding surface 120, sliding surface 120 may tend to deflect toward a ground surface. This deflection may adversely affect evacuation times as passengers may concentrate in the areas of greatest deflection. Further, the deflection of sliding surface 120 may result in ruptures or other structural failures of evacuation slide 110. As such, truss straps 142 may assist in maintaining the structural integrity of evacuation slide 110 and help ensure passengers can evacuate the aircraft at an efficient pace. Evacuation slide 110 may further comprise one or more truss strap integrated geometric restraints 150 as will be discussed in further detail below.

Figure 2A:
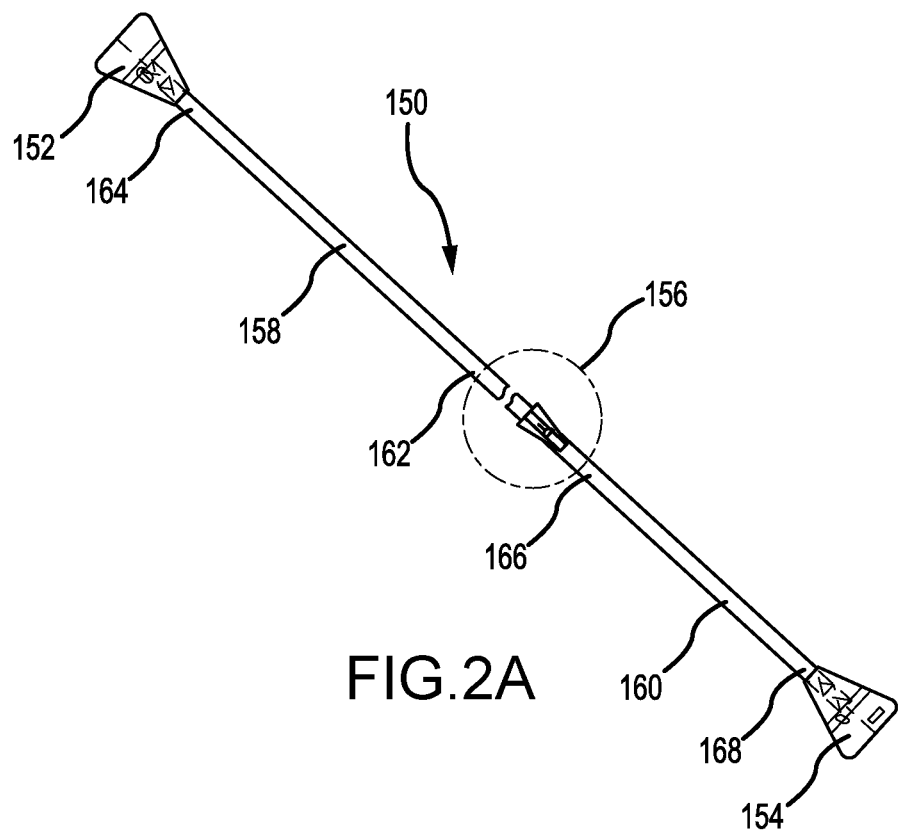
FIGS. 2A and 2B illustrate a truss strap integrated geometric restraint and a detail view of a truss strap integrated geometric restraint release assembly, respectively, in accordance with various embodiments.
Figure 2B:
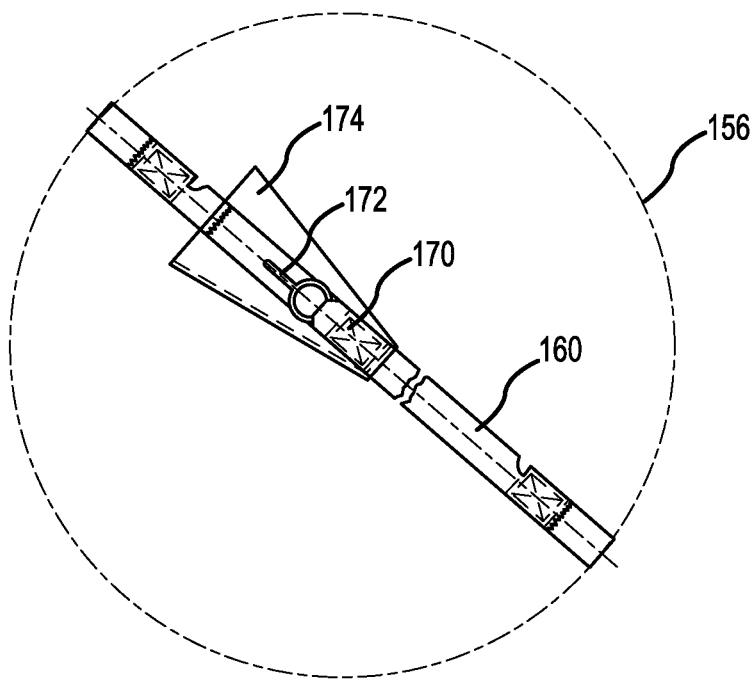

Referring now to FIGS. 2A and 2B, truss strap integrated geometric restraint 150 is illustrated in further detail. Truss strap integrated geometric restraint 150 may be configured to increase the structural integrity of an evacuation slide (for example, evacuation slide 110 illustrated in FIGS. 1A and 1B), while also assisting in ensuring that the evacuation slide deploys in the desired sequence. For example, truss strap integrated geometric restraint 150 may be coupled to a first portion of the evacuation slide (for example head end 114 or toe end 116 with momentary reference to FIGS. 1A and 1B) and coupled to a second portion of the evacuation slide (for example, head end 114 or toe end 116 with momentary reference to FIGS. 1A and 1B). Truss strap integrated geometric restraint 150 may further be detachably coupled to a third portion of the evacuation slide. As the evacuation slide is inflated, truss strap integrated geometric restraint 150 may prevent certain portions of evacuation slide from expanding, thereby preventing inflation of targeted sections of the evacuation slide. As will be discussed in further detail below, at a certain stage in the deployment process, truss strap integrated geometric restraint 150 may decouple from a targeted portion of the evacuation slide 110 in response to a predetermined load, thereby allowing the evacuation slide 110 to complete inflation.

Truss strap integrated geometric restraint 150 comprises a first attachment 152 and a second attachment 154 opposite first attachment 152. First attachment 152 may be coupled to a first portion of the evacuation slide 110, while second attachment 154 may be coupled to a second portion of the evacuation slide 110. First attachment 152 and second attachment 154 may comprise a patch of fabric that may be sewn, heat-welded, or otherwise coupled to the evacuation slide 110. In various embodiments, first attachment 152 and second attachment 154 may comprise a substantially triangular geometry, however, are not limited in this regard and may comprise any suitable shape.

Truss strap integrated geometric restraint 150 further comprises a release assembly 156 positioned between first attachment 152 and second attachment 154. For example, release assembly 156 may be coupled to a first strap 158 and a second strap 160. First strap 158 may be coupled to release assembly 156 on a first end 162 and coupled to first attachment 152 on a second end 164. Similarly, second strap 160 may be coupled to release assembly 156 on a first end 166 and coupled to second attachment 154 on a second end 168. First strap 158 and second strap 160 may comprise a material similar to that of truss strap 142 discussed with reference to FIGS. 1A and 1B. Further, first strap 158 and second strap 160 may achieve a function similar to that of truss straps 142, that is, to increase the structural integrity of the evacuation slide as passengers disembark from an aircraft on the evacuation slide 110.

Release assembly 156 may comprise a third strap 170. Third strap 170 may be coupled to or integral with second strap 160. For example, third strap 170 may be sewn or otherwise coupled to second strap 160, however, in various embodiments, may be an extension of second strap 160. In various embodiments, third strap 170 may comprise a length shorter than first strap 158 and/or second strap 160.

Release assembly 156 may further comprise a release pin 172 coupled to an end of third strap 170. Release pin 172 may comprise a parachute pin or similar pin in various embodiments. Third strap 170 and/or release pin 172 may be covered via cover 174 in various embodiments. Cover 174 may be configured to hide and/or mask third strap 170 and/or release pin 172 prior to third strap 170 and/or release pin 172 being exposed during deployment of the evacuation slide. Cover 174 may comprise nylon, ballistic nylon, polypropylene, polyester, cotton, or other suitable material.

Figure 3A:
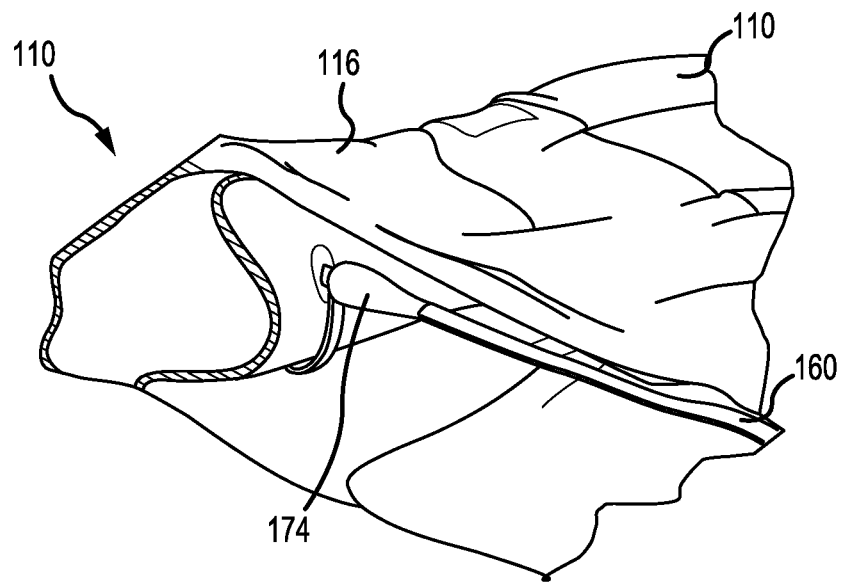
FIGS. 3A and 3B illustrate staged deployment of an evacuation slide including a truss strap integrated geometric restraint, in accordance with various embodiments.
Figure 3B:
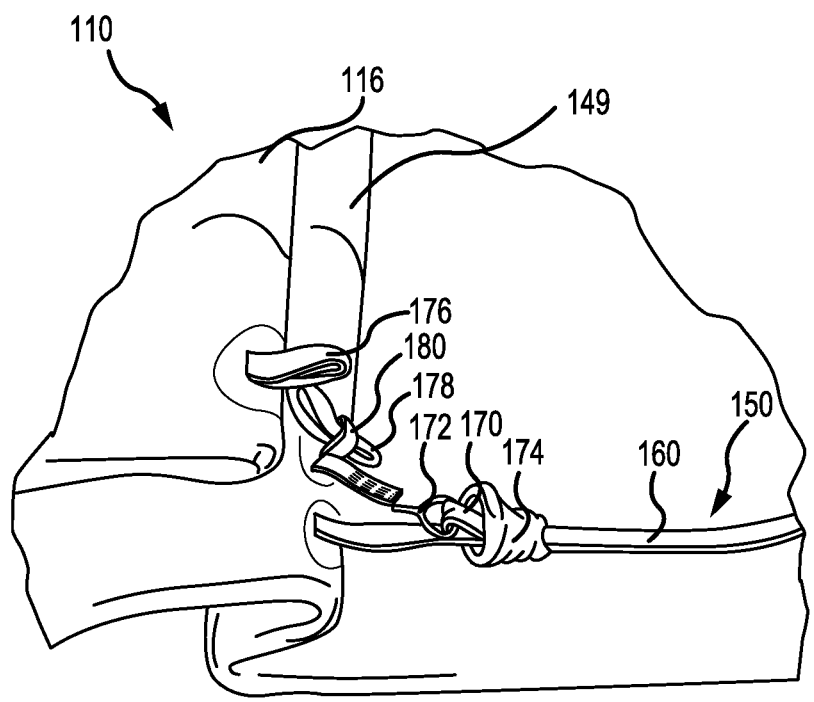

With reference to FIGS. 3A and 3B, evacuation slide 110 is illustrated in a folded or stowed position, in accordance with various embodiments. When evacuation slide 110 is in the folded position, evacuation slide 110 may include one or more folds 149. Truss strap integrated geometric restraint 150 may aid in maintaining folds 149 and assist in a staged deployment of evacuation slide 110.

In accordance with various embodiments, a portion of evacuation slide 110, such as toe end 116, may include one or more loops, such as first loop 176 and second loop 178, coupled to evacuation slide 110. Release assembly 156 is configured such that evacuation slide 110 is maintained in the folded position when release pin 172 is engaged with (i.e., located in) first and/or second loops 176, 178. In this regard, evacuation slide 110 may unfold in response to release pin 172 disengaging from (i.e., translating out) first and/or second loops 176,178.

In various embodiments, first loop 176 may be coupled to toe end 116 of evacuation slide 110. First loop 176 may be coupled to evacuation slide 110 via sewing, adhesive, fasteners, or any other suitable attachment technique. In various embodiments, second loop 178 may be coupled to evacuation slide 110 via an attachment loop 180 coupled to evacuation slide 110. For example, second loop 178 may be coupled to evacuation slide 110 by locating second loop 178 through attachment loop 180. First loop 176, second loop 178, and/or attachment loop 180 may each comprise rope, tape, ribbon, webbing (e.g., nylon or ballistic nylon], or other suitable material.

Figure 4:
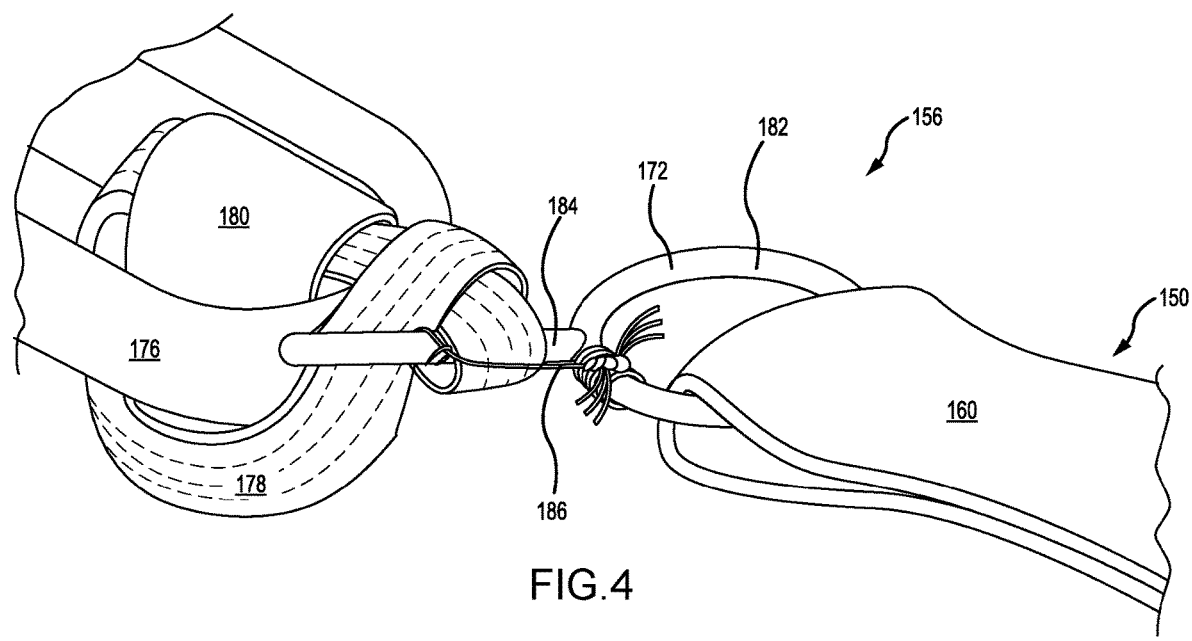
FIG. 4 illustrates an assembled release assembly of an evacuation slide comprising a truss strap integrated geometric restraint, in accordance with various embodiments.

With reference to FIG. 4, a release assembly 156 of truss strap integrated geometric restraint 150 is shown prior to being separated from evacuation slide 110. In accordance with various embodiments, first loop 176 may be secured to third strap 170 of truss strap integrated geometric restraint 150 by locating second loop 178 through first loop 176 and locating release pin 172 through second loop 178. Locating release pin 172 through second loop 178 tends to prevent or block first loop 176 from separating or decoupling from second loop 178 and truss strap integrated geometric restraint 150. In this regard, coupling first loop 176 to truss strap integrated geometric restraint 150, via second loop 178 and release pin 172, tends to maintain evacuation slide 110 in the folded position.

With combined reference to FIGS. 3A, 3B, and 4, in accordance with various embodiments, release pin 172 is configured to translate out second loop 178, in response to an internal pressure in evacuation slide 110 exceeding a predetermined threshold pressure. For example, in response to evacuation slide 110 being deployed, a pressurized vessel may supply a flow of pressurized gas to evacuation slide 110, and evacuation slide 110 may begin to inflate and an internal pressure of evacuation slide 110 may increase. Evacuation slide 110 may be maintained in the folded position until the internal pressure of evacuation slide 110 has increased above the predetermined threshold pressure. Release pin 172 may translate out second loop 178 once the internal pressure of evacuation slide 110 has increased above the predetermined threshold pressure, thereby allowing first loop 176 to separate from second loop 178. Evacuation slide 110 may unfold (i.e., toe end 116 may translate away from third strap 170 of truss strap integrated geometric restraint 150) in response to release pin 172 translating out second loop 178.

In various embodiments, release pin 172 may include a ring 182 and a shaft 184 extending from the ring 182. Shaft 184 may be located through second loop 178. In various embodiments, a string 186 may be coupled to ring 182 and shaft 184. String 186 may be attached to release pin 172, after locating shaft 184 through second loop 178. String 186 may be attached to release pin 172 such that second loop 178 is located between ring 182 and the portion of string 186 that is coupled to shaft 184. Coupling string 186 to shaft 184 and ring 182 tends to prevent or reduce occurrences of release pin 172 translating out second loop 178 prior to the internal pressure of evacuation slide 110 exceeding the predetermined threshold pressure. In accordance with various embodiments, string 186 is configured to sever in response to the force generated by translation of release pin 172 during deployment of evacuation slide 110. Stated differently, during deployment, the force generated by internal pressure of evacuation slide 110 causes release pin 172 and third strap 170 to translate away from second loop 178 and toe end 116, thereby severing string 186.

Truss strap integrated geometric restraint 150 may be configured to accomplish multiple functions, while limiting part counts, costs, and weight associated with evacuation slide 110. For example, truss strap integrated geometric restraint 150 may aid in increase the structural integrity of the evacuation slide (similar to traditional truss straps), while also aiding in the staged deployment of the evacuation slide (similar to traditional geometric restraints).

In various embodiments, truss strap integrated geometric restraint 150 may be coupled to evacuation slide 110 in various ways to accomplish various intended deployment sequences. For example, referring briefly to FIGS. 1A and 1B, truss strap integrated geometric restraint 150 may be coupled to head end 114 and toe end 116. However, the release assembly of truss strap integrated geometric restraint 150 may be positioned anywhere along the length of the evacuation slide and coupled to any portion of evacuation slide 110, such that a desired staged deployment can be achieved. FIG. 1A illustrates the release assembly being positioned proximate to toe end 116 of evacuation slide 110, while FIG. 1B illustrates the release assembly being positioned proximate a middle of evacuation slide 110.

Figure 5:
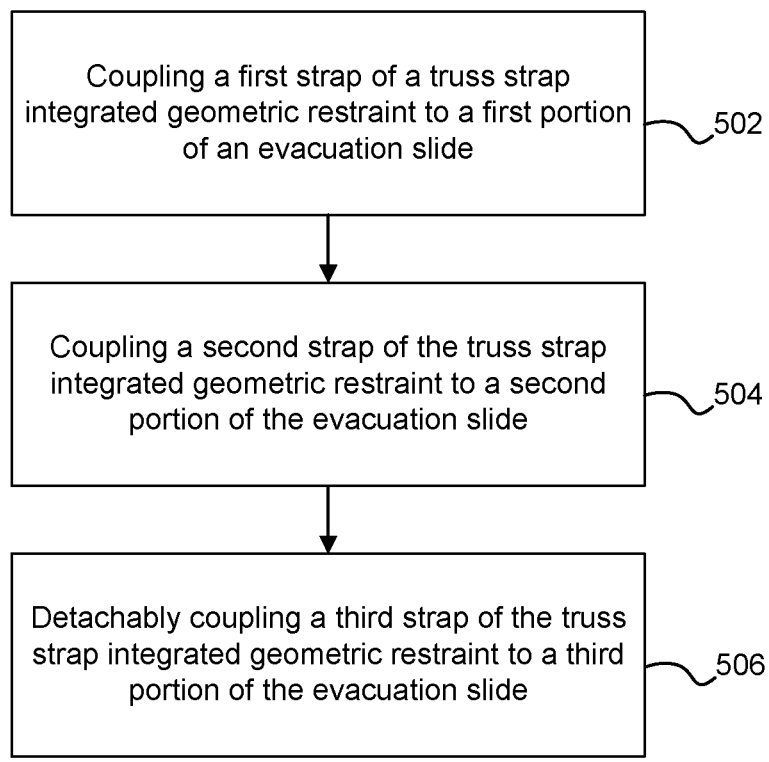
FIG. 5 illustrates a method of assembling an evacuation slide including a truss strap integrated geometric restraint, in accordance with various embodiments.

With reference now to FIG. 5, a method 500 for assembling an evacuation slide is illustrated. In general, the method 500 may comprise coupling a first strap of a truss strap integrated geometric restraint to a first portion of an evacuation slide (step 502). The method may further comprise coupling a second strap of the truss strap integrated geometric restraint to a second portion of the evacuation slide (step 504). The method may further comprise detachably coupling a third strap of the truss strap integrated geometric restraint to a third portion of the evacuation slide (step 506).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and articles media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A truss strap integrated geometric restraint for an evacuation slide, the truss strap integrated geometric restraint comprising:
   a first strap configured to be coupled to a first portion of the evacuation slide,
   a second strap configured to be coupled to a second portion of the evacuation slide,
   a third strap detachably coupled to a third portion of the evacuation slide and configured to disengage from the third portion of the evacuation slide in response to a predetermined force acting on a release assembly, wherein the truss strap integrated geometric restraint is configured to increase beam strength of the evacuation slide, and
   the release assembly positioned between the first strap and the second strap,
   wherein the release assembly comprises the third strap and a release pin coupled to the third strap,
   wherein the release pin comprises a ring portion and a shaft portion extending from the ring portion,
   wherein, when the evacuation slide is in a folded position, the shaft portion of the release pin is located through a second loop coupled to a toe end of the evacuation slide thereby maintaining the evacuation slide in the folded position,
   wherein, in the folded position, the second loop passes through an attachment loop coupled to another portion of the evacuation slide and a first loop coupled to the toe end, and
   wherein, in response to the predetermined force acting on the release assembly, the shaft portion of the release pin translates out of the second loop allowing the second loop to pass through the first loop and the attachment loop thereby allowing the evacuation slide to inflate.

2. The truss strap integrated geometric restraint of claim 1, wherein the truss strap integrated geometric restraint further comprises a first attachment coupled to the first strap.

3. The truss strap integrated geometric restraint of claim 1, wherein the truss strap integrated geometric restraint further comprises a second attachment coupled to the second strap.

4. The truss strap integrated geometric restraint of claim 1, further comprising a cover surrounding the release pin and the third strap.

5. The truss strap integrated geometric restraint of claim 1, wherein the release pin comprises a parachute pin.

6. An evacuation slide, comprising:

a head end and a toe end opposite the head end;

a truss strap integrated geometric restraint coupled to the head end and the toe end, the truss strap integrated geometric restraint configured to assist a staged deployment of the evacuation slide and increase beam strength of the evacuation slide, wherein the truss strap integrated geometric restraint comprises:

a first strap configured to be coupled to a first portion of the evacuation slide, a second strap configured to be coupled to a second portion of the evacuation slide, a third strap detachably coupled to a third portion of the evacuation slide and configured to disengage from the third portion of the evacuation slide in response to a predetermined force acting on a release assembly, and the release assembly positioned between the first strap and the second strap, wherein the release assembly comprises the third strap and a release pin coupled to the third strap, wherein the release pin comprises a ring portion and a shaft portion extending from the ring portion, wherein, when the evacuation slide is in a folded position, the shaft portion of the release pin is located through a second loop coupled to the toe end of the evacuation slide thereby maintaining the evacuation slide in the folded position, wherein, in the folded position, the second loop passes through an attachment loop coupled to another portion of the evacuation slide and a first loop coupled to the toe end, and wherein, in response to the predetermined force acting on the release assembly, the shaft portion of the release pin translates out of the second loop allowing the second loop to pass through the first loop and the attachment loop thereby allowing the evacuation slide to inflate.

7. The evacuation slide of claim 6, wherein the truss strap integrated geometric restraint further comprises a first attachment coupled to the first strap.

8. The evacuation slide of claim 6, wherein the truss strap integrated geometric restraint further comprising a second attachment coupled to the second strap.

9. The evacuation slide of claim 6, further comprising a string coupled to the release pin and the second loop and configured to sever to allow the release pin to decouple from the second loop.

10. A method of assembling an evacuation slide, the method comprising:

coupling a first strap of a truss strap integrated geometric restraint to a first portion of an evacuation slide;

coupling a second strap of a truss strap integrated geometric restraint to a second portion of an evacuation slide;

detachably coupling a third strap of the truss strap integrated geometric restraint to a third portion of the evacuation slide, wherein the truss strap integrated geometric restraint is configured to aid in staged deployment of the evacuation slide and increase beam strength of the evacuation slide;

positioning a release assembly between the first strap and the second strap, wherein the release assembly comprises the third strap and a release pin coupled to the third strap and wherein the release pin comprises a ring portion and a shaft portion extending from the ring portion;

inserting, when the evacuation slide is in a folded position, the shaft portion of the release pin through a second loop coupled to a toe end of the evacuation slide thereby maintaining the evacuation slide in the folded position, wherein, in the folded position, the second loop passes through an attachment loop coupled to another portion of the evacuation slide and a first loop coupled to the toe end; and translating, in response to a predetermined force acting on the release assembly, the shaft portion of the release pin out of the second loop allowing the second loop to pass through the first loop and the attachment loop thereby allowing the evacuation slide to inflate.

11. The method of claim 10, wherein the first portion is the toe end of the evacuation slide and the second portion is a head end of the evacuation slide.

* * * * *